United States Patent
Szwedowicz et al.

(10) Patent No.: US 9,255,488 B2
(45) Date of Patent: Feb. 9, 2016

(54) SEALING ARRANGEMENT FOR A THERMAL MACHINE

(75) Inventors: Jaroslaw Leszek Szwedowicz, Bad Zurzach (CH); Stefan Irmisch, Oberrohrdorf (CH); Alexey Mozharov, Nussbaumen (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 1054 days.

(21) Appl. No.: 13/355,685

(22) Filed: Jan. 23, 2012

(65) Prior Publication Data

US 2012/0219405 A1    Aug. 30, 2012

(30) Foreign Application Priority Data

Feb. 28, 2011   (CH) ...................................... 0343/11

(51) Int. Cl.
*F01D 11/00* (2006.01)
*F16J 15/08* (2006.01)

(52) U.S. Cl.
CPC ........... *F01D 11/006* (2013.01); *F16J 15/0887* (2013.01); *F05D 2240/57* (2013.01); *F05D 2300/505* (2013.01)

(58) Field of Classification Search
CPC . F05D 2300/505; F01D 11/00; F01D 11/001; F01D 11/003; F01D 11/005; F01D 11/006
See application file for complete search history.

(56) References Cited

U.S. PATENT DOCUMENTS

| | | | |
|---|---|---|---|
| 6,039,262 A * | 3/2000 | DeAnna | ...................... 236/93 R |
| 6,485,255 B1 | 11/2002 | Care et al. | |
| 6,561,764 B1 | 5/2003 | Tiemann | |
| 7,448,849 B1 | 11/2008 | Webster et al. | |
| 2004/0239039 A1* | 12/2004 | Plona | ............................ 277/361 |
| 2007/0243061 A1 | 10/2007 | Taylor et al. | |
| 2010/0202888 A1 | 8/2010 | Miller | |
| 2010/0209251 A1 | 8/2010 | Menheere et al. | |
| 2011/0020125 A1 | 1/2011 | Schlosser et al. | |
| 2011/0236183 A1* | 9/2011 | Amaral et al. | ................. 415/134 |

FOREIGN PATENT DOCUMENTS

| | | |
|---|---|---|
| DE | 10 2007 001 459 | 7/2007 |
| EP | 1207324 | 5/2002 |

(Continued)

OTHER PUBLICATIONS

Office Action issued on Jun. 26, 2014, by the Russian Patent Office in corresponding Russian Patent Application No. 2012107060.06(010735). (6 pages).

(Continued)

*Primary Examiner* — Ninh H Nguyen
*Assistant Examiner* — Jeffrey A Brownson
(74) *Attorney, Agent, or Firm* — Buchanan Ingersoll & Rooney PC

(57) ABSTRACT

A sealing arrangement for sealing a gap (22) between two adjacent, thermally loaded components (14, 14') of a thermal machine, especially a turbomachine or gas turbine, includes a seal (25) which is supported in a recess (23) which extends transversely to the gap (22) and traverses said gap (22). An efficient and simple improvement of the sealing arrangement is made by the seal (25) being formed at least partially of a shape memory alloy in such a way that, when a pre-specified temperature limit is exceeded, the seal changes its sealing behavior.

14 Claims, 3 Drawing Sheets

(56) References Cited

FOREIGN PATENT DOCUMENTS

| EP | 1602864 | 12/2005 |
| EP | 2000709 | 12/2008 |
| EP | 2116621 | 11/2009 |
| EP | 2 369 204 A1 | 9/2011 |
| GB | 2467582 | 8/2010 |
| JP | 58206807 A | 12/1983 |
| JP | 59-018209 | 1/1984 |
| JP | 60-111004 | 6/1985 |
| JP | 10-35001 A | 2/1998 |
| JP | 2003-526039 A | 9/2003 |
| JP | 2009203948 | 9/2009 |
| JP | 2011-202804 A | 10/2011 |
| RU | 2301897 C1 | 6/2007 |
| SU | 1506209 A1 | 9/1989 |

OTHER PUBLICATIONS

Search Report from Swiss Patent App. No. 00343/2011 (Mar. 25, 2011).

Office Action (Notification of Reasons for Refusal) dated Oct. 27, 2014, issued by the Japanese Patent Office in corresponding Japanese Patent Application No. 2012-038481, and an English translation of the Office Action. (6 pages).

Notice of Allowance issued Nov. 6, 2014 by the Russian Patent Office in corresponding Russian Patent Application No. 2012107060/06(010735).

* cited by examiner

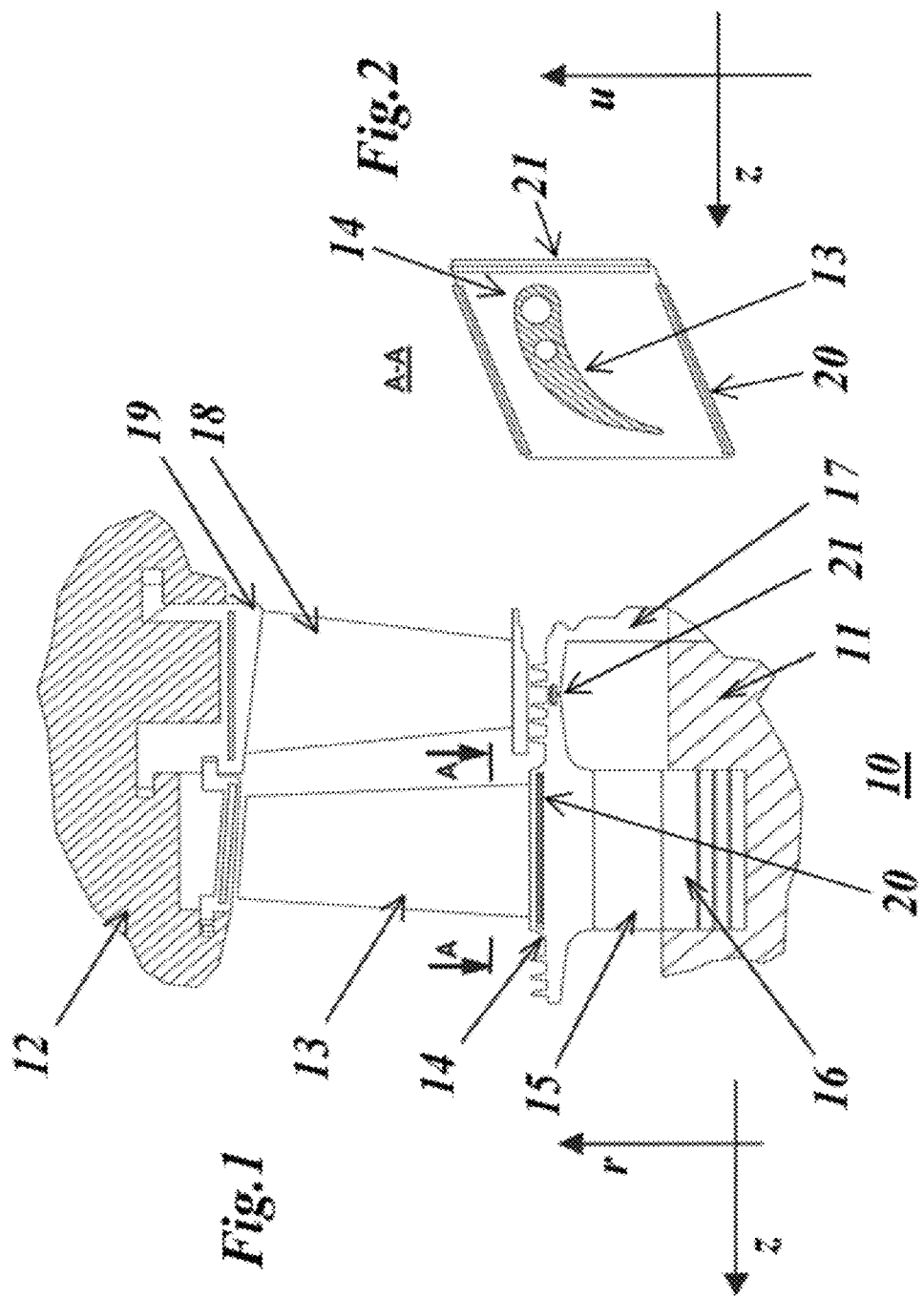

SEALING ARRANGEMENT FOR A THERMAL MACHINE

This application claims priority under 35 U.S.C. §119 to Swiss Application No. 00343/11, filed Feb. 28, 2011, the entirety of which is incorporated by reference herein.

BACKGROUND

1. Field of Endeavor

The present invention relates to the field of machine elements in conjunction with thermal machines, and more particularly to a sealing arrangement.

2. Brief Description of the Related Art

In thermal machines, such as gas turbines, or electromechanical machines, such as electric generators, the cooling of thermally loaded components is an essential parameter for the overall efficiency and the service life of the system. In most cases, the cooling medium is cooling air; however, steam from a steam generator can also be used for the same purpose. The subsequently disclosed subject matter is correspondingly applicable to all cooling media, regardless of the supply source, but is explained using the example of an air-cooled gas turbine.

In a gas turbine, air is compressed by a centrifugal or axial compressor from the ambient pressure to nominal pressure. After cooling of the hot parts of the combustion chamber, the main portion of the compressed air is used for combusting fuel in the combustion chamber. The rest of the compressed air is extracted at one or more points along, or at the end of, the compressor, and directed through cooling air passages to the hot parts of the gas turbine. In the turbine, the cooling medium is used for the internal or external cooling of the turbine components, such as stator blades and rotor blades. In addition, the cooling medium reduces the operating temperature of non-rotating and rotating components, such as the blade roots or rotor disks, which are exposed to large centrifugal forces.

Some of the air is also used for sealing purposes, particularly between rotating and stationary parts, by the air being purged through a gap into the hot gas passage of the turbine in order to prevent entry of hot gas and therefore local overheating. The seal plays an important role in the effective distribution and controlling of the cooling air. On account of mechanical and thermal stresses and the thermal expansion of the components during operation, however, the gaps which are to be sealed alter in their dimensions. In the stationary state of the machine, each rotating and non-rotating component is assembled with other parts, taking into consideration manufacturing and assembly tolerances and also the anticipated mechanical and thermal deformation of the components. The cold gaps which therefore result enable the unhindered thermal expansion and rotation-induced deformation of the components during operation by the gaps which result in the process, the so-called hot gaps, at no time adopting unacceptably small values. The unhindered expansions and deformations prevent mechanical defects in each component where they adjoin other components.

Under operating conditions, depending upon the thermal and mechanical load of the respective component, the resulting hot gaps can become smaller or larger than the cold gaps relative to the stationary state of the machine. An example of such changes in a gas turbine is shown in FIGS. 1-3. FIG. 1 shows in a detail a typical arrangement of rotor blades and stator blades in a gas turbine, including the seals—in this case exemplarily of a strip-like construction—which are arranged between the components. The gas turbine 10 of FIG. 1 includes a rotor 11 which is equipped with rotor blades 13 and is enclosed by a turbine casing or stator blade carrier 12. The rotor blades 13 have an (inner) platform 14 (14'), beneath which the blade merges into a shank 15, on the end of which is arranged a blade root 16 by which the rotor blade 13 is fastened in the rotor 11. Stator blades 18, which have a(n) (outer) platform 19, are attached on the turbine casing or stator blade carrier 12. The blade airfoils of the rotor blades and stator blades 13, 18 lie in the hot gas passage of the turbine.

For sealing in relation to the hot gas passage, provision is made for seals—in this case exemplarily constructed as sealing strips 20, 21 (FIG. 2)—which extend in the axial direction (z-axis in FIG. 2) and in the circumferential direction (u-axis in FIG. 2), but can also extend in the radial direction and be arranged between adjacent platforms 14 (14') of blades or between blades and adjacent heat shields 13, 17 or ring segments, as well as between adjacent heat shields (when provided). According to FIG. 3a, the sealing strips 21 lie transversely to the gap 22 between the platforms 14 and 14' of adjacent components in a corresponding recess 23.

As exemplarily indicated in FIG. 3b, the gap between the rotor blades of each turbine stage increases during operation. Under the influence of centrifugal forces, the rotor blades are stretched in the radial direction, which results in a larger gap c in the circumferential direction between the platforms of the blades.

This enlargement of the gap in the circumferential direction is partially compensated for by the thermal expansion of the blade platforms. Depending upon the blade mass and the operating temperature, the thermal deformations of the platforms are usually less than the blade deformations which are brought about as a result of rotation. Therefore, the gap c between the blade platforms of longer blades in the circumferential direction during operation can be either larger than the cold gap $c_0$ in the stationary state of the machine (FIG. 3a), or it can be smaller, which applies typically to non-rotating components or light rotor blades, the deformations of which are principally determined by the thermal load. In general, during operation the gaps can vary considerably depending upon the mechanical and thermal load of the rotating and non-rotating components of the machine. Furthermore, the radius of the platforms 14, 14', which in the stationary state can have the value $R_0$ (FIG. 3a), can acquire another value R (FIG. 3b) during operation.

In order to passively control the gaps during operation of the machine, according to FIG. 2 provision is made for axially and circumferentially extending seals—in this case exemplarily constructed as strips 20 or 21—which prevent an uncontrolled leakage of the cooling medium into the hot gas passage of the turbine. The seals 20, 21 generally are formed of an alloy which is suitable for the operating conditions of the machine.

The seals which are arranged in rotating components are pressed against the platforms of the rotor blades as a result of centrifugal forces. Consequently, a mechanical contact between the upper side of the seal 21 and the outer flanks of the seal groove 23 is created inside the platforms or heat shields 14, 14', which is schematically shown in FIG. 3b. On account of the thermal expansion and rotation-induced deformations, the effective hot gap c (FIG. 3b) becomes larger during operation, whereas the width b of the seal 21 remains practically unaltered on account of its small dimensions relative to the size of the blade, of the rotor and of the heat shields. The mechanical contact which is created can be limited to a narrow contact area on the seal which does not lead directly to the best possible sealing effect or can even lead to undesirable or increased leakage on account of local deformations of the platform.

In the prior art, considerations have already been made to purposefully control sealing conditions in thermal machines by the use of memory alloys.

An arrangement of a rotor and a stator of a turbine, in which rotor blades with a blade airfoil and (inner) platform and stator blades with a blade airfoil and (inner) platform alternate with each other, is known from printed publication US 2007/0243061. Between the platforms of the rotor blades and the platforms of the stator blades a seal is defined, wherein the platforms of the rotor blades and/or stator blades in the region of the seal partially are formed of a memory alloy in order to control the cooling air flow through the seal in dependence upon temperature. Such controlling through the platforms themselves is extremely costly in production and dimensioning, because the blades themselves have to be constructed from different material and correspondingly prefabricated.

U.S. Pat. No. 7,086,649 B2 discloses an annular seal for inserting between two parts which rotate relatively to each other. The seal includes a section which can bend for altering the sealing gap. Such a section can be formed of a bimetal or a memory alloy in order to alter the gap width in a temperature-controlled manner.

A device for controlling the clearance between the blade tip of a rotor blade and the opposite wall of an axial turbine, in which the radial position of the wall is controlled by a spiral spring, formed of a memory alloy, which shifts the wall, is known from printed publication JP58206807.

The seals which are described in the introduction are not the subject of known proposals.

SUMMARY

One of numerous aspects of the present invention includes a sealing arrangement of the aforementioned type for a thermal machine, which takes into account the altered conditions in an automatic and simple manner if the machine gaps between stationary state and operation alter.

Another aspect includes a sealing arrangement for sealing a gap between two adjacent, thermally and/or mechanically loaded components of a thermal machine, especially a turbomachine or gas turbine, comprising a seal which is supported in a recess which extends transversely to the gap and traverses the gap. The seal is formed at least partially of a memory alloy in such a way that when a pre-specified temperature limit is exceeded, it alters its sealing behavior.

One development of a sealing arrangement as described herein is characterized in that at least one of the components is a rotor blade of a rotor of a turbomachine.

According to another development, both components are rotor blades of a rotor of a turbomachine.

It is also conceivable, however, that the other component is a heat shield (or a ring segment) of a rotor of a turbomachine.

Another development is characterized in that the components have, in each case, a platform, and in that the seals are arranged in a manner extending between the platforms in the axial and/or circumferential direction and/or radial direction.

A further development is characterized in that the seal comprises in each case at least one first component (particularly a horizontal strip) which is supported in the recess which extends transversely to the gap, in that the seal furthermore has at least one second component (especially a vertical strip) which extends along the gap perpendicularly to the horizontal strip, and in that at least the at least one second component is formed of a memory alloy.

It is particularly advantageous if in this case the seal has two second components which extend along the gap perpendicularly to the first component if both second components are formed of a memory alloy, and if both second components are designed in such a way that when the pre-specified temperature limit is exceeded, they come to bear against opposite walls of the gap with sealing effect. As a result of this, it is possible to achieve additional sealing effects over and above the effect of the first component.

A further development is characterized in that the second components extend from the first component essentially towards one side beyond the recess into the gap and, when the pre-specified temperature limit is exceeded, form a second seal there.

Another development is characterized in that the second components extend from the first component towards opposite sides beyond the recess into the gap and, when the pre-specified temperature limit is exceeded, form a second and a third seal there.

The first component in this case can be formed of a metal alloy, for example steel.

It is also conceivable, however, that the first component is formed of a memory alloy. In this way, the first component can also contribute towards the controlling of the sealing behavior.

Another development is characterized in that provision is made for two first components formed of a memory alloy, which when the pre-specified temperature limit is exceeded, come to bear against opposite walls of the recess with sealing effect. As a result of this, the controlled sealing characteristics can be improved even further.

A further improvement can be achieved if the first and/or second components of a memory alloy are provided with thickened portions (especially side protrusions) for improving the sealing characteristics.

Finally, each seal can comprise at least one first component which is supported in the recess which extends transversely to the gap, the first component can have a transfer passage, and the transfer passage can be closed off by a valve strip formed of a memory alloy, in such a way that when a pre-specified temperature limit is exceeded, it frees the transfer passage. In this way, in the case of high thermal load the cooling can locally be altered in a directed manner.

BRIEF DESCRIPTION OF THE DRAWINGS

The invention shall subsequently be explained in more detail based on exemplary embodiments in conjunction with the drawing. In the drawing FIG. 1 shows, in a detail, a typical arrangement of rotor blades and stator blades in a gas turbine including the seals—in this case exemplarily of a strip-like design—which are arranged between the components;

FIG. 2 shows the section through the rotor blade from FIG. 1 in the plane A-A;

DETAILED DESCRIPTION OF EXEMPLARY EMBODIMENTS

Figure 3:
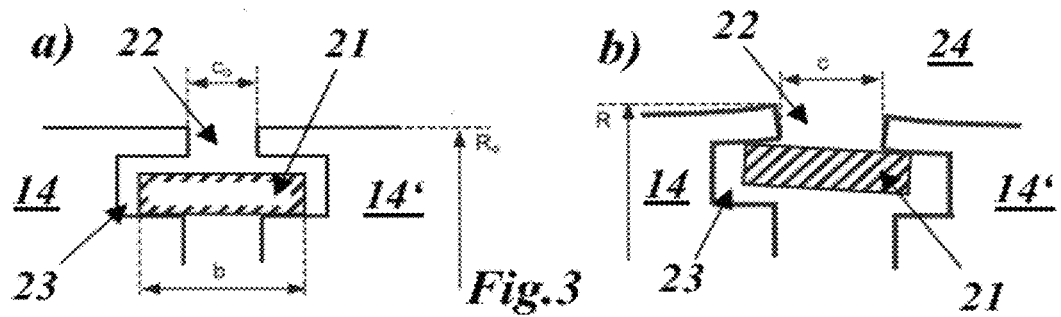
FIG. 3 shows the behavior of a conventional sealing strip between adjacent rotor blades, or rotor blade and adjacent heat shield, in the stationary state of the turbine and at room temperature (FIG. 3a) and also at nominal speed and operating temperature (FIG. 3b)

It can be particularly advantageous to produce the seal wholly or partially from a memory alloy (shape-memory alloy, SMA). Above a pre-specified temperature limit, which can be lower than the nominal temperature, or in the course of a continuously rising operating temperature, the part of the seal formed of a memory alloy automatically activates and alters or improves the sealing characteristics. The shrinking-, stretching-, torsional-, and bending deformations of the memory alloy create a mechanism for improving the sealing characteristics in a simple sealing system, for example produced from steel, as is shown in FIG. 3 in the form of the sealing strip 21.

Figure 4:
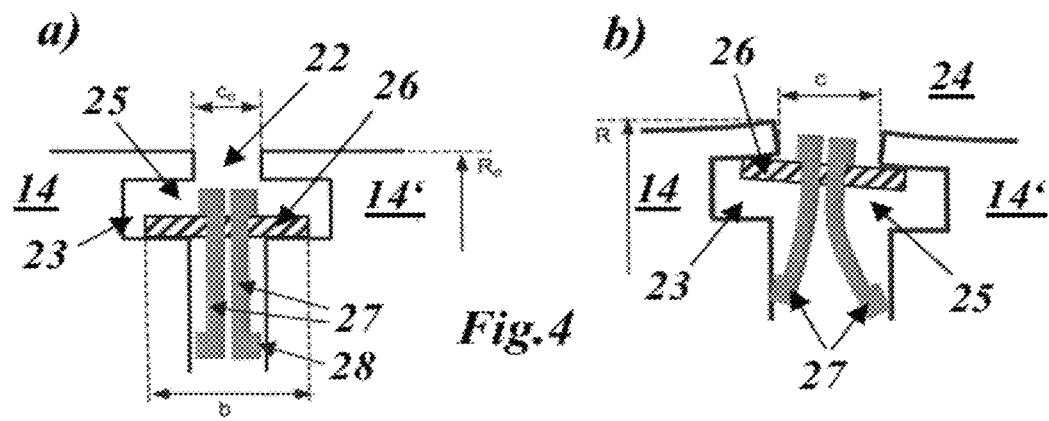
FIG. 4 shows the behavior of a sealing arrangement with two-way sealing effect according to an exemplary embodiment of the invention between adjacent rotor blades, or rotor blade and adjacent heat shield, in the stationary state of the turbine and at room temperature (FIG. 4a) and also at nominal speed and operating temperature (FIG. 4b)

FIG. 4 shows an example of a sealing arrangement according to principles of the invention, which is based on a sealing strip 25 with a horizontal strip 26 (first component) formed of a conventional seal material. Connected to this horizontal strip 26 are two vertical strips 27 (second components), formed of a memory alloy, which extend downwards in parallel. The horizontal strip 26, similar to the sealing strip 21 in FIG. 3a, is accommodated in a recess 23 which lies transversely to the gap 22 (FIG. 4a). During an operation above the temperature limit or in the case of rising operating temperature, the vertical strips 27 bend outwards towards the respectively adjacent platform 14 or 14' in order to lie in mechanical contact there with sealing effect (FIG. 4b). In order to boost this deformation process, side protrusions 28, which intensify the contact-producing deformation, can be arranged at the ends of the vertical strips 27. The vertical strips 27 are of sufficient length in order to achieve the necessary elasticity of the coupled platform-seal system. This elasticity ensures that a permanent contact between the blades and the seals is provided even in the event of vibrations in the turbine stage. The vertical strips 27, which make contact with sealing effect according to FIG. 4b, in addition to the horizontal strip 26, create a second seal so that the sealing arrangement according to FIG. 4, in contrast to the single-stage sealing arrangement of FIG. 3, is a two-stage sealing arrangement.

Figure 5:
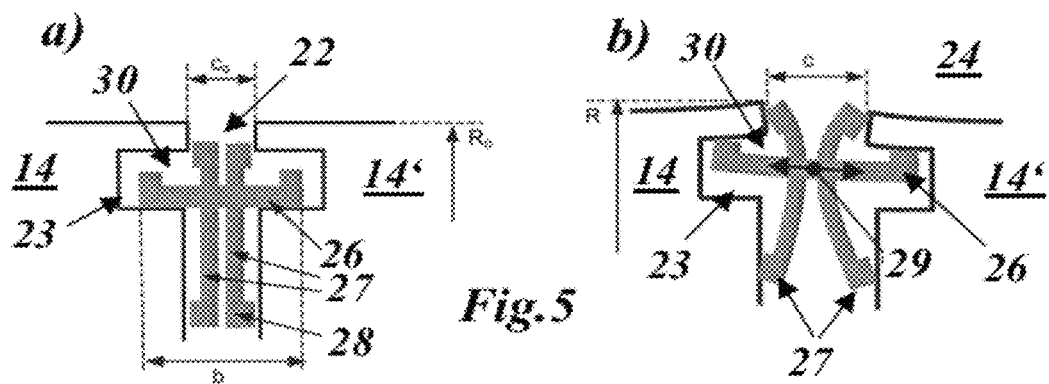
FIG. 5 shows the behavior of a sealing arrangement with three-way sealing effect according to another exemplary embodiment of the invention between adjacent rotor blades, or rotor blade and adjacent heat shield, in the stationary state of the turbine and at room temperature (FIG. 5a) and also at nominal speed and operating temperature (FIG. 5b)

In order to create a three-stage sealing arrangement, the horizontal strip 26 according to FIG. 5 can be produced from a memory alloy. Above the temperature limit, or in the case of steadily rising operating temperature, the horizontal strip 26 of the sealing strip 30 stretches in opposite horizontal directions in order to better take up the increasing clearance c (FIG. 5b). At the same time, the two vertical strips 27 of the memory alloy follow the expansion 29 of the horizontal strip 26 and separate in the direction of the adjacent platforms 14 and 14'. The centrifugal forces, which act upon the side protrusions at the upper ends of the two vertical strips 27, bend these vertical strips outwards. This bending creates mechanical contacts with the upper sections of the adjacent platforms 14 and 14', as is shown in FIG. 5b. The bending characteristics and expansion characteristics of the sealing system of memory alloy therefore enable a three-stage sealing arrangement with only one sealing strip 30.

Figure 6:
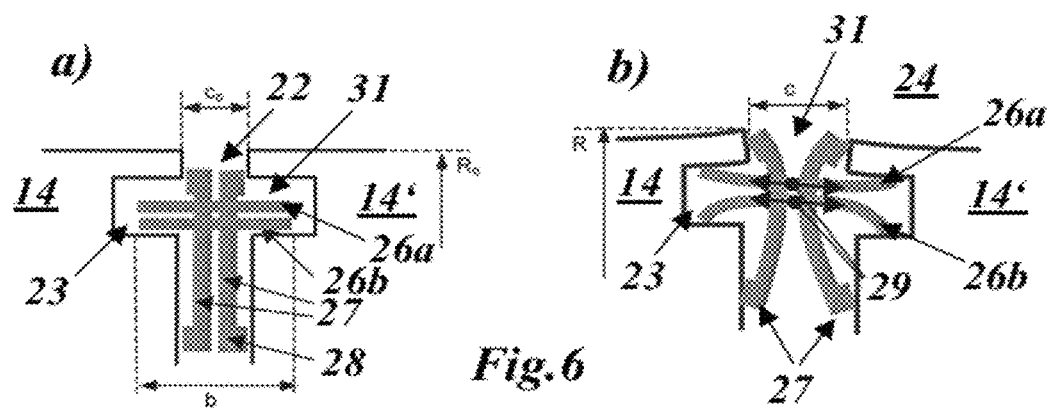
FIG. 6 shows the behavior of a sealing arrangement with four-way sealing effect according to another exemplary embodiment of the invention between adjacent rotor blades, or rotor blade and adjacent heat shield, in the stationary state of the turbine and at room temperature (FIG. 6a) and also at nominal speed and operating temperature (FIG. 6b)

In the previous explanations, the joining technique for connecting the individual strips 26 and 27 to each other was not elaborated upon in more detail. However, all possible joining techniques for producing the proposed sealing arrangement can be used. Also, the configurations of the sealing strips which are explained in detail must be understood only as examples, wherein the seals may also be formed of non-strip-like elements or components. Other configurations of the sealing arrangement are possible within the scope of the invention and may contain other mechanisms for deformation of the memory alloy, and also differently formed constructions and combinations of different geometric shapes which are triggered as a result of thermal, mechanical or other load. Thus, FIG. 6 illustrates for example a sealing arrangement with a sealing strip 31, in which two horizontal strips 26a and 26b of a memory alloy first of all expand in the case of a thermal load above the temperature limit or in the case of a steadily rising operating temperature (expansion 29 in FIG. 6b) and are then bent in opposite radial directions. In this way, an additional fourth sealing stage between the adjacent blades is achieved.

The memory alloy which is used may include different metallurgical compositions of different elements and be produced in a different way. The temperature and/or the mechanical change which is dependent upon the operating conditions of the machine initiate the process of the geometrical change of the strip of the memory alloy, which depends upon the production of that memory alloy. In the case of a decrease of the cold gap $c_0$, the shrink behavior of the memory alloy is taken into consideration, instead of expansion in fact, as has been described here.

A sealing arrangement as described herein, which operates with a memory alloy, can also be used in all other machines where an active leakage control is necessary. Thus, such a sealing arrangement can be used for example in cryogenic apparatus such as helium and/or hydrogen liquefiers or, for example, refrigeration plants with operating temperatures below the freezing point. In this case, a reduction in the operating temperature is the principal mechanism which controls the active leakage control using the sealing arrangement.

A SMA sealing arrangement as described herein can also be equipped with additional emergency characteristics. Above a permissible temperature, the SMA sealing arrangement can be opened, for example in order to supply an overheated region of a selected component with more cooling medium. Such a system can be arranged in cooling passages of the machine or inside cooling passages of a hot component. Another emergency function of such a SMA sealing arrangement can be to open above a permissible temperature, which is exceeded on account of entry of hot gas, in order to avoid, for example, local overheating of the blade platform or of another component and also of the sealing arrangement itself. Such a function avoids damage to the sealing arrangement as a result of self-opening.

Figure 7:
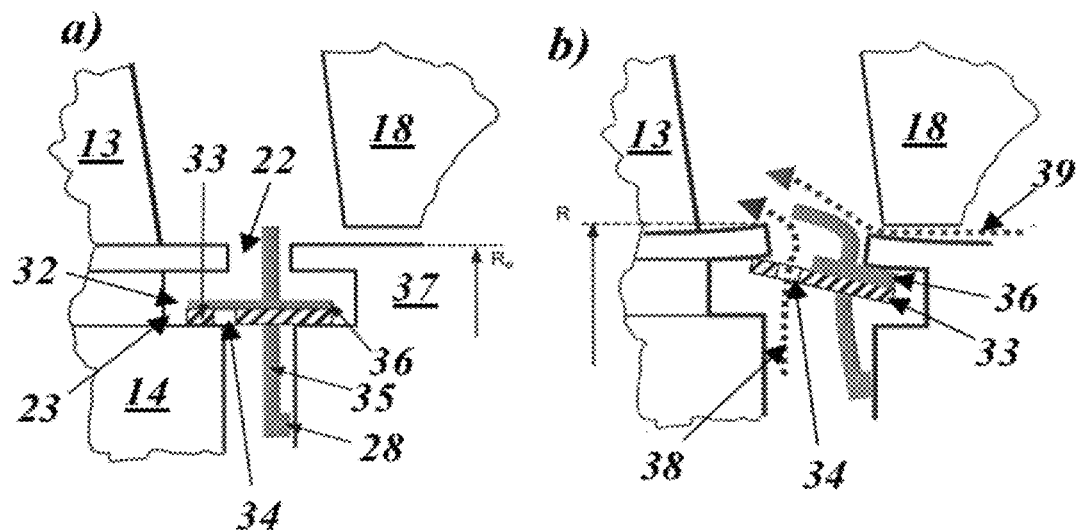
FIG. 7 shows the behavior of a sealing arrangement with valve function according to another exemplary embodiment of the invention between rotor blade and adjacent heat shield in the stationary state of the turbine and at room temperature (FIG. 7a) and also at nominal speed and operating temperature (FIG. 7b).

The sealing arrangement can vary in reaction to an excessively high metal temperature of the platform or to an excessively high gas temperature which is induced as a result of a hot gas flow (39 in FIG. 7b) for example between the upper side of a heat shield (37 in FIG. 7) and the tip of the stator blade (18 in FIG. 7). As one of many possible configurations, FIG. 7 exemplarily shows a sealing arrangement with a sealing strip 32 which features such an emergency characteristic. Above the temperature limit, a valve strip 36 shrinks, and in the stationary state of the machine covers a transfer passage 34 in a base strip or horizontal strip 33 (formed of steel) lying beneath the valve strip, and opens this (preferably slot-like) opening 34 in order to admit an unhindered cooling medium flow into the hot blade passage. The upper part of the vertical strip 35 of memory alloy bends in order to direct the cooling air flow 38 to the overheated regions of the platform 14 and of the rotor blade 13. At the same time, the bent vertical strip 35 guides the hot gas flow 39 away from the overheated region. The last-named characteristic can also be used in conjunction with a horizontal strip, formed of steel, without transfer passage 34. The overheated region is then protected by the bent vertical strip by the hot gas flow 39 being deflected towards the upper part of the blade.

Overall, with seals as described herein the following additional characteristics and advantages can ensue:

- The sealing arrangement can be used in different machines, the adjacent components of which expand variably during operation on account of diverse monotonic and/or cyclic loads between stationary state, partial load, nominal load and/or overload;
- The sealing arrangement, depending upon requirement, can intensify sealing or can open;
- The sealing arrangement can be used between adjacent components formed of the same or different material;
- The sealing arrangement can improve the sealing behavior;
- The sealing arrangement can act as an emergency valve which brings about additional cooling of an overheated region of a protected component if the system exceeds a limit in temperature, in pressure, in centrifugal load or in another parameter;
- The service life of the components in question is consequently extended;
- The higher cooling medium consumption of the machine which is brought about as a result can be used as a parameter for monitoring and possible shutting down of the machine.

LIST OF DESIGNATIONS

10 Gas turbine (turbomachine)
11 Rotor
12 Turbine casing
13 Rotor blade
14, 14', 19 Platform
15 Shank
16 Blade root
17 Adjacent blade (or heat shield)
18 Stator blade
20, 21 Seal
22 Gap
23 Recess (groove)
24 Hot gas passage
25, 30, 31 Seal
26, 26a,b Component (for example horizontal strip)
27 Component (for example vertical strip)
28 Thickened portion (for example side protrusion)
29 Expansion
32 Seal
33 Component (for example base strip/horizontal strip)
34 transfer passage
35 Component (for example vertical strip)
36 Valve strip
37 Heat shield
38 Cooling air flow
39 Hot gas flow
b Width
$c_0$ Cold gap
c Hot gap
u Circumferential direction
r Radial direction
R, $R_0$, R' Radius
z Axial direction While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A sealing arrangement for sealing a gap, the sealing arrangement comprising:
    a thermal machine including two adjacent, thermally and/or mechanically loaded components, and a gap between the two components;
    a recess which extends transversely to and traverses the gap;
    a seal supported in the recess, the seal formed at least partially of a shape memory alloy and being configured and arranged so that, when a pre-specified temperature limit is exceeded, the seal changes a sealing behavior in the recess; and
    wherein the seal comprises at least one first element supported in the recess which extends transversely to the gap, and at least one second element which extends along the gap perpendicularly to the first element and at least the at least one second element is formed of a shape memory alloy.

2. The sealing arrangement as claimed in claim 1, wherein the thermal machine comprises:
    a turbomachine having a rotor and a rotor blade; and
    at least one of the components is said rotor blade.

3. The sealing arrangement as claimed in claim 1, wherein the thermal machine comprises:
    a turbomachine having a rotor and rotor blades; and
    both components are rotor blades.

4. The sealing arrangement as claimed in claim 2, wherein the turbomachine includes a heat shield and the other component is said heat shield.

5. The sealing arrangement as claimed in claim 2, wherein each of the components comprises:
    a platform; and
    the seal extends between the platforms in an axial direction, a circumferential direction, a radial direction, or combinations thereof.

6. The sealing arrangement as claimed in claim 1, wherein the seal comprises:

two second elements which extend along the gap perpendicularly to the first element;

both second elements are formed of a memory alloy; and both second elements are formed so that, when a pre-specified temperature limit is exceeded, both second elements come to bear against and seal with opposite walls of the gap.

7. The sealing arrangement as claimed in claim 6, wherein the second elements extend from the first element towards one side beyond the recess into the gap and, when a pre-specified temperature limit is exceeded, form a second seal.

8. The sealing arrangement as claimed in claim 6, wherein the second elements extend from the first element towards opposite sides beyond the recess into the gap and, when a pre-specified temperature limit is exceeded, form second and third seals.

9. The sealing arrangement as claimed in claim 1, wherein the first element is formed of a metal alloy.

10. The sealing arrangement as claimed in claim 1, wherein the first element is formed of a shape memory alloy.

11. The sealing arrangement as claimed in claim 1, wherein the at least one first element comprises two first elements formed of a shape memory alloy, which two first elements, when a pre-specified temperature limit is exceeded, bear against and seal with opposite walls of the recess.

12. The sealing arrangement as claimed in claim 1, wherein the at least one first element, the at least one second element, or both, comprise thickened portions configured and arranged to improve sealing.

13. The sealing arrangement as claimed in claim 1, wherein the seal comprises:

at least one first element supported in the recess which extends transversely to the gap, wherein the at least one first element has a transfer passage, and a valve strip formed of a memory alloy positioned to close off the transfer passage so that, when a pre-specified temperature limit is exceeded, the valve strip frees the transfer passage.

14. The sealing arrangement as claimed in claim 1, wherein the thermal machine comprises a turbomachine or gas turbine.

* * * * *